United States Patent Office 2,810,654
Patented Oct. 22, 1957

2,810,654

PROCESS FOR PRODUCING POROUS PLASTICS FROM UNSATURATED FATS AND OILS AND THEIR DERIVATIVES

Åge Solbakken, Trondheim, Norway

No Drawing. Application March 29, 1954,
Serial No. 419,590

Claims priority, application Norway March 31, 1953

7 Claims. (Cl. 106—122)

The preparation of factice from unsaturated oils by reacting them with sulfur or sulfur-monochloride is a well known procedure. The rubberlike products obtained are for instance used as substitutes for rubber and in rubber mixtures.

In recent years porous or foam products made from rubber and plastics have found increased application for different purposes. It was therefore of interest to investigate if such porous products could be based on factice also, and the applicants have found that the reaction between the unsaturated oil and the sulfur-monochloride may be combined with reactions which produce a gas at the same time as the product is hardened. In this way porous factice is obtained directly from the oil or from the mixture in which the unsaturated oil reacts with the sulfur-monochloride.

As far as is known a process like this has not been mentioned or proposed earlier, and the following description is restricted to the information necessary to explain the procedure.

When factice ordinarily is made from unsaturated oils and sulfur-monochloride, the monochloride is added to the double bonds of the oil, and practically no reaction products are split off. However, when small amounts of water or alcohol are incorporated in the oil, corresponding amounts of hydrochloric acid are formed before or at the same time as the oil reacts with the monochloride. Other compounds may also be used for the formation of hydrochloric acid by reaction with the sulfur-monochloride. This hydrochloric acid is utilized for gas evolution from proper substances which also are added to the oil before the reaction, for instance carbonates, bicarbonates or bisulfites. So far, bicarbonates have been found most satisfactory, and the amount of carbon dioxide evolved is easily controlled by the amount of water or alcohol incorporated in the oil.

The gas volume evolved may also be regulated by the amount of bicarbonate.

In both cases a wide variation of the size and number of pores in the vulcanized product may be obtained and the porous factice may have specific gravities from for instance 0.4 to 0.05 kg./l. The properties of the products are also dependent upon the unsaturation, or the iodine values, of the oils and on the proportion of sulfur-monochloride to oil. Oils having iodine values from 150 to 200, like cod liver oil and linseed oil, give soft and elastic products, more unsaturated oils or oil derivatives, like tung oil, highly unsaturated oil fractions and glycerol or pentaerythritolesters of the most unsaturated fatty acids, having iodine values from 220 to 300, may give more hard to very hard products.

The addition reaction of sulfur-monochloride to the double bonds of the oils is exothermic, and especially with most unsaturated oils or oil derivatives the heat evolved may cause the temperature to rise too high, and some destruction of the product to take place. To avoid this an addition of buffers as phosphates has been found useful. The addition of phosphates and other buffer salts has also another important effect on the product, the inflammability of the product is very much decreased.

When bicarbonate is used as the gas forming ingredient, the water formed from the reaction with hydrochloric acid also reacts with the sulfur-monochloride, and only small amounts of water or alcohol are necessary for starting the reaction.

It has been found that very satisfactory products also may be obtained where fillers such as cellulose, wood meal, lignin, talcum, fuller's earth or asbestos are incorporated in the oil before the reaction.

Furthermore the properties of the products may be regulated by modifying the oils before the reaction, e. g. by polymerization or halogenation or by addition of inert oils like mineral oils.

Example 1

100 parts of dry linseed oil, 30 parts of dry $NaHCO_3$ and 2 parts of ethanol were emulgated together. 45 parts of $S_2Cl_2$ were added under violent agitation. $CO_2$-evolution started after 30–40 seconds, the bubbles caused a blowing up of the mass which then stiffened to a porous, soft and elastic mass of specific gravity 0.10.

Example 2

100 parts of cod liver oil, 0.5 part of water, 2 parts of $NaHCO_3$ and 15 parts of $(NH_4)_2HPO_4$ were thoroughly mixed and 40 parts of $S_2Cl_2$ added under violent agitation. The reaction was finished after 2 to 3 minutes. A porous, plastic and elastic product was obtained, which was non-inflammable.

Example 3

100 parts of a pentaerythritolester of a fraction of highly unsaturated fatty acids, iodine value 250, 40 parts of $NaHCO_3$ and 1.5 parts of ethanol were thoroughly mixed and 45 parts of $S_2Cl_2$ added under violent agitation. The evolution of $CO_2$ and the addition reaction took place in 10 to 15 seconds, and the heat of the reaction caused the temperature to rise to about 250° C. After cooling, a hard, very porous and light product was obtained, having a specific gravity of 0.07 kg./l.

As agents for forming hydrochloric acid by reaction with sulfur-monochloride, there are preferably used lower aliphatic alcohols, for example methanol or ethanol. As agents for developing gas by reaction with the formed hydrochloric acid there are preferably used alkali bicarbonates, for example sodium bicarbonate, thereby forming carbonic acid gas.

I claim:

1. The method of preparing a porous factice product which comprises admixing with an ester of an unsaturated fatty acid small amounts respectively of a member of the group consisting of water and a lower aliphatic alcohol, and a member of the group consisting of carbonates, bicarbonates, and bisulfites decomposable by acid with gas generation, and reacting the mixture under strong agitation with sulfur monochloride until the ester is vulcanized and generation of gas in situ has transformed the mixture into a porous mass.

2. The method of preparing a porous factice product which comprises admixing with an ester of an unsaturated fatty acid small amounts of water and an alkali metal bicarbonate, and reacting the mixture under strong agitation with sulfur monochloride until the ester is vulcanized and generation of carbon dioxide gas in situ has transformed the mixture into a porous mass.

3. The method of preparing a porous factice product which comprises admixing with an ester of an unsaturated fatty acid small amounts of ethanol and an alkali metal bicarbonate, and reacting the mixture under strong agitation with sulfur monochloride until the ester is vulcanized and generation of carbon dioxide gas in situ has transformed the mixture into a porous mass.

4. The method of preparing a porous factice product which comprises admixing with linseed oil approximately 30% of sodium bicarbonate and 2% of ethanol by weight, and reacting the mixture under strong agitation with approximately 45% of sulfur monochloride until generation of carbon dioxide in situ has transformed the mixture into a porous mass.

5. The method of preparing a porous factice product which comprises admixing with cod liver oil approximately 0.5% of water, 2% of sodium bicarbonate, and 15% of diammonium phosphate by weight, and reacting the mixture under strong agitation with approximately 40% of sulfur monochloride until generation of carbon dioxide in situ has transformed the mixture into a porous mass.

6. The method of preparing a porous factice product which comprises admixing with the pentaerythritol ester of an unsaturated fatty acid mixture having an iodine value of 250, approximately 40% of sodium bicarbonate and 1.5% of ethanol by weight, and reacting the mixture under strong agitation with approximately 45% of sulfur monochloride until generation of carbon dioxide in situ has transformed the mixture into a porous mass.

7. The method of preparing a porous factice product which comprises admixing with an ester of an unsaturated fatty acid from 2 to 40% of sodium bicarbonate, from 0.5 to 2.0% of a member of the group consisting of water and a lower aliphatic alcohol, and reacting the mixture under strong agitation with from 40 to 45% of sulfur monochloride until the ester is vulcanized and generation of carbon dioxide gas in situ has transformed the mixture into a porous mass.

References Cited in the file of this patent

UNITED STATES PATENTS

| | | |
|---|---|---|
| 713,190 | Zimmer | Nov. 11, 1902 |
| 1,371,016 | Bennett et al. | Mar. 8, 1921 |
| 1,471,059 | Planson | Oct. 16, 1923 |
| 1,873,542 | Bunbury | Aug. 23, 1932 |
| 2,299,593 | Roberts | Oct. 20, 1942 |
| 2,613,189 | Sarbach | Oct. 7, 1952 |

FOREIGN PATENTS

| | | |
|---|---|---|
| 73,584 | Germany | Feb. 19, 1893 |

OTHER REFERENCES

Hackh's Chemical Dictionary, 3rd ed., The Blakiston Co., 1944, p. 331.

Flame-Proofing Textile Fabrics by R. W. Little, Reinhold, 1947, p. 51.